United States Patent [19]

Mohwinkel

[11] 4,135,003
[45] * Jan. 16, 1978

[54] PROCESS OF PRESERVING VEGETABLE PRODUCE, SUCH AS POTATOES, IN CLOSED PACKAGES

[75] Inventor: Franz Mohwinkel, Ahlften uber Soltau, Germany

[73] Assignee: Washington Nu Process, Inc., Quincy, Wash.

[ * ] Notice: The portion of the term of this patent subsequent to Apr. 25, 1989, has been disclaimed.

[21] Appl. No.: 215,888

[22] Filed: Jan. 6, 1972

Related U.S. Application Data

[63] Continuation of Ser. No. 804,694, Mar. 5, 1969.

[30] Foreign Application Priority Data

Mar. 9, 1968 [DE] Fed. Rep. of Germany ....... 7751830
Aug. 21, 1968 [DE] Fed. Rep. of Germany ....... 1792332

[51] Int. Cl.² .......................... C12C 3/04; A23B 7/00
[52] U.S. Cl. .................................. 426/412; 426/637; 426/523
[58] Field of Search ................. 99/1, 100, 150 R, 154, 99/186, 189, 214; 426/412

[56] References Cited

U.S. PATENT DOCUMENTS

| | | | |
|---|---|---|---|
| 3,102,034 | 8/1963 | Weinberg | 99/186 |
| 3,215,538 | 11/1965 | Soda | 99/214 |
| 3,261,140 | 7/1966 | Long | 53/428 |
| 3,481,688 | 12/1969 | Craig | 99/214 |
| 3,511,169 | 5/1970 | Fritzberg | 99/214 |
| 3,531,300 | 9/1970 | Greenberg | 426/412 |
| 3,552,982 | 1/1971 | Savedge | 99/214 |
| 3,658,559 | 4/1972 | Mohwinkel | 99/100 P |

FOREIGN PATENT DOCUMENTS 1132785 7/1962 Fed. Rep. of Germany ............. 99/189

*Primary Examiner*—Norman Yudkoff
*Attorney, Agent, or Firm*—Cushman, Darby & Cushman

[57] ABSTRACT

A process of preserving vegetable produce, such as potatoes and green vegetables, in closed packages, in which peeled or shelled raw produce which may be sliced or otherwise comminuted is vacuum-packed in plastics containers which are then treated, in a cooking receptacle, with a heating medium at a temperature of about 100° C. while subjected to an external pressure in said cooking receptacle exceeding the internal pressure in said packages and are finally cooled while still subject to the higher external pressure.

9 Claims, No Drawings

PROCESS OF PRESERVING VEGETABLE PRODUCE, SUCH AS POTATOES, IN CLOSED PACKAGES

This is a continuation, of application Ser. No. 804,694, filed Mar. 5, 1969.

The invention relates to a process of preserving, in closed packages in cooking autoclaves or cooking receptacles, vegetable produce, of the type usually preserved in cans or bottles, such as potatoes and green vegetables and the like.

In the known processes of preserving potatoes and green vegetables by canning or bottling them in water a product is obtained which can be preserved for a relatively long period but which, as a result of being stored in a preserving liquid, deteriorates in flavor and loses valuable nutrient substances which are leached out by the liquid. Moreover, canning and, in particular, bottling are expensive and inconvenient and, when buying, the customer cannot see the product in the can, which is a possible disadvantage.

The object of this invention is to remove the present disadvantages and to provide an improved process of producing preserved food which hardly differs in taste from the fresh product and which, even in the wrapped state, affords an attractive appearance.

A further object of this invention is to provide a process of producing well preserved food which is readily usable without further cooking.

Yet another object of this invention is to provide a process of producing a produce which keeps for a relatively long period of time and which is neither leached out nor deteriorated in appearance and particularly color and taste compared to the natural product.

A further object of this invention is to produce a food-product which is available to the user in packages, the quality of which he or she can judge by eye.

Further and other objects and advantages of the invention will be apparent from the following detailed description thereof.

According to the invention the vegetable products, such as potatoes and green vegetables, are peeled or shelled, if desired comminuted, and are vacuum packed in plastics containers, whereupon the closed packages are welded and placed in a cooking receptacle and a heating medium, such as water, preferably steam is supplied thereto. The produce in the packages is cooked at temperatures of about 100° C. under an external pressure in the receptacle exceeding the internal pressure in the packages and is finally cooled, while still maintained under the higher external pressure used during the cooking step. The requisite higher pressure is obtained, for instance, by increasing the vapor pressure, which is due to the preserving treatment with steam, by means of a supply of compressed air. If preserving is carried out in a water bath, then the necessary pressure is preferably obtained by supplying compressed air to the steam space adjacent the water level. To ensure that a sufficient excess pressure is maintained in the space around the packages, compressed air is supplied until, at the preserving temperature, the entire external pressure in the cooking receptacle considerably exceeds the partial pressure of the water vapor of 1 atms.

The preserving process, which can be a boiling or steaming process, is carried out in autoclaves or cooking receptacles containing water or water vapor. It has been found that when working in the autoclave in an exclusively water-vapor atmosphere, as is usual in using cooking autoclaves, the vacuum-sealed packages therein burst open. Obviously when preserving food in packages, apart from the development of water vapor, other gases are released so that the total internal pressure becomes so high that the package bursts open. It has been observed that this undesired effect occurs both in the steam space of an autoclave and in the water bath.

In accordance with the invention, it has now been ascertained that splitting and bursting of the packages can be safely avoided if, during cooking, the packages which are filled with the wrapped fresh produce and then closed are surrounded with a higher external pressure independent of the cooking temperature. In accordance with the invention, this causes the water vapor flowing into the autoclave to mix with the additional cold compressed air. Thus, it can readily be arranged that the vapor destined to pass into the autoclave and filling it is compounded with cold compressed air and this mixture is supplied to the autoclave. It is thus possible to regulate the temperature in the autoclave according to the amount of compressed air added. For example, the temperature of about 120° C., which arises with a pure water-vapor excess pressure of 1 atms., can be reduced to, for example, 100° C. without affecting the excess pressure of 1 atms. A constant temperature of, for example, 100° C. can be easily maintained by continuously passing the corresponding compressed air/water-vapor mixture through the autoclave.

It has been found that, because of the relatively lower temperature with relative excess pressure, the generation of gas in the packaging containers, for example, a bag, is so slight that the bag is firmly compressed by the external pressure, so that it no longer bursts open. If it is boiled in the water bath, the water can be heated to about +100° C. in the cooking receptacle by means of a thermostat and a compressed air globe (dome) can be placed in the top of the receptacle by supplying compressed air. The bags, which in known methods are very quickly blown up on heating and press against the surface, remain in position with the process according to the invention and the produce therein can finish cooking without the bags blowing up and/or bursting.

The temperature control, which is carried out independently of pressure according to the invention, has another important advantage, namely that the fresh produce no longer needs to be subjected to too high a cooking temperature which, for example with potatoes preserved without any addition of water, would have a very disadvantageous effect on the quality since it can lead to incrustation and discoloration of the surface of the potatoes. Similarly, delicate vegetables are frequently subject to a disadvantageous discoloration in known methods.

Experiments have shown that, for example in the usual processing of raw potatoes, if they are cooked in vacuum-sealed packages, a considerable amount of gas begins to evolve at a temperature of about +25° C., so that the formation of gas does not take place only when the processing temperature or the boiling point of the processing medium has been reached. The same applies to practically all types of fresh vegetables. The entire process according to the invention must therefor be carried out under the aforementioned higher external pressure.

Even at the end of the cooking time, the pressure surrounding the closed containers in the cooking receptacle must first be higher than the internal pressure which arises or has arisen through the generation of gas inside the packages. The packages must therefore also be cooled under pressure. Cooling water is preferably used for cooling the packages. Since particular types of produce, particularly potatoes, only radiate heat very slowly, care must be taken to see that the higher external pressure is maintained as long as the produce is still hot, otherwise it cannot be certain that the packages will not split open.

It is therefore preferable if the autoclave is not opened during the cooling process. Cooling is carried out firstly by the vapor in the space surrounding the packages being forced out with cold compressed air by way of an outlet valve. Because only air and not steam passes out through this valve, cooling water is forced under pressure through a connecting water pipe into the autoclave until all the containers are covered with water. The pressure is then released and the autoclave can be opened.

When cooking in a water bath, the cooling water is likewise forced under pressure into the cooking receptacle, so that the hot water is forced out through a relief pressure valve. Similarly here, the receptacle can be opened after all the packages have been covered with water and then sufficiently cooled.

The preserving time is determined by the particular kinds of produce types involved and can be easily ascertained by simple preliminary tests in each case.

It can be seen that, by using the process of the invention, any sort of produce can be preserved, either in separate individual packages or even in different combinations in one common package. The latter is particularly suitable if packed vegetable and potato portions for one meal, put into single packages, are to be made available for consumers. With the process according to the invention, it is possible to provide such a single-pack arrangement in a combination which is attractive to the consumer. The cooking time for such packages is determined by the cooking time for the kind of produce which has the longest cooking time.

It has been discovered that even with delicate types of vegetables, such as peas and asparagus, which as a rule can only be bottled with difficulty, bursting of the packages is safely avoided and a satisfactory packaging and preservation can be achieved.

The process according to the invention has the advantage that a produce is obtained which keeps for a relatively long period of time and which is neither leached out nor deteriorated in appearance and particularly color compared to the natural product. This produce is available to the user in packages, the quality of which he or she can judge by eye. Where various kinds of produce, e.g. peas together with carrots and potatoes, are preserved in single packages according to the process of the invention, the housewife has the possibility of using them either at one meal or separately from one another. Since the individual types of produce in the prepared raw state are supplied separately to the containers and after feeding in a certain type the filling space in each single container is divided off from the rest of the space for example by welding (heat-sealing), when preparing for meals, the housewife can serve up the individual kinds separately or bring them to the table in any combination, in accordance with personal taste and choice.

Moreover, since the wrapping material used in the process according to the invention is a one-way package which is very cheap, particularly when compared with known glass containers, washing, return and storage of empty containers, which has been necessary up till now, is no longer required, thus illustrating another technical advantage of the process according to the invention.

The invention will be further illustrated by reference to the following specific examples of preferred embodiments thereof.

EXAMPLE 1

700 g portions of raw peeled potatoes were put into plastic bags. The bags were then vacuumised in a vacuum apparatus and welded, i.e. closed by heat--sealing. 300 of such bags each containing 700 g of potatoes were then placed in layers into a 600 liter autoclave regulated for a steam pressure of up to 1.5 atms and the autoclave was then closed.

The autoclave was connected to a water pipe, a steam/air pipe and a thermometer; furthermore, a regulating valve was located at the top of the autoclave, to control the desired steam pressure.

Firstly, steam with a pressure of 0.7 atms was admitted to the filled autoclave until the thermometer at the top of the autoclave indicated $+100°$ C. At this point, the steam was removed through the pressure relief valve which has been adjusted to 0.6 atms. A compressed-air line, connected to the steam line leading to the autoclave at about 1 meter away, remained closed by means of a stop valve at the beginning of the heating process. When the thermometer showed $+100°$ C., the air line was opened sufficiently to inject compressed air into the steam so that the temperature remained constant at 100° C. Without the addition of air, the temperature would otherwise rise to $+115°$ C.

By adding compressed air, the pressure was kept constant at 0.6 atms in the autoclave and the thermometer remained practically constant at the desired temperature.

The cooking process lasted about 35 minutes.

After this time, the steam was turned off and the compressed-air valve opened so that only cold compressed air flowed into the vessel. In order to blow the steam out of the autoclave as quickly as possible, compressed air was blown in at 1.5 atms. When most of the steam has been removed through the pressure relief valve after about 5 minutes, the attached water pipe was opened, which then forced cooling water into the autoclave at 2.5 atms. This was continued until water instead of air came out of the pressure relief valve. This indicated that the autoclave was filled with water and thus all the bags has been covered. The temperature recorded on the thermometer has dropped to about $+30°$ C.

The autoclave was then opened and the packages removed and placed in a cooling chamber. The potatoes were then quickly cooled down to $+8°$ C. to $+10°$ C. by the water which flowed into the chamber. They were then packed in cartons.

EXAMPLE 2

400 portions of raw, washed, comminuted carrots were placed in plastic bags each holding 1000 g of produce. They were then placed under vacuum and the filled spaces closed with a welded seam. 200 g of raw, shelled peas were then placed in the remaining empty space and the bags were again placed in the vacuum apparatus and then welded at the open end. As described in Example 1, 300 bags each containing a total of 600 g of carrots and peas were packed in layers. The autoclave was then closed and, as described in Example 1, was set and maintained at the desired excess pressure of 0.6 atms and at a constant cooking temperature of about +100° C.

The cooking process lasted 2½ hours.

After this time, as in Example 1, the steam was turned off and the cooked produce was cooled under pressure until the temperature recorded on the thermometer had dropped to about +30° C. The autoclave was then opened and the packages removed and placed in a cooling chamber with water. The wrapped preserved vegetables were quickly cooled to +8° C. to +10° C. and the packages were then packed in cartons.

It will be appreciated that various modifications and variations in addition to those suggested above may be made in the process of the invention, and accordingly it will be understood that the invention is to be limited only within the scope of the appended claims.

I claim:

1. In the process of preserving vegetable produce, such as potatoes and green vegetables, in closed packages, the improvement comprising placing the peeled or shelled raw vegetable produce into an empty plastic container, vacuum sealing the container without the addition of any water so that there is no water therein other than the natural juices within the raw produce therein, treating said vacuum sealed container in a cooking receptacle for a period of time from about 35 minutes about 2½ hours with a heating medium at a temperature of about 100° C while subjecting said container during cooking to an external pressure in said cooking receptacle exceeding the internal pressure in said container such that the container is firmly compressed and the produce therein can finish cooking without the container blowing up and bursting, and then cooling said container while it is still subject to the higher external pressure, and further wherein the packaged vegetables, after the cooking treatment and cooling, are stored in said vacuum sealed container at room temperature for considerable periods of time without deterioration of the wholesomeness of the produce.

2. The process of claim 1 wherein the plastic container is transparent so that the produce therein may be seen without opening the container.

3. The process according to claim 1, in which the heating medium is steam.

4. The process according to claim 2, in which the higher external pressure is maintained by increasing the vapor pressure present during cooking by means of compressed air introduced into said cooking receptacle.

5. A process according to claim 4, in which the amount of compressed air admitted is so that, at the preserving temperature, the total external pressure considerably exceeds the partial pressure of the steam of 1 atms.

6. The process according to claim 1, in which the heating medium is water.

7. The process according to claim 4, in which the external pressure required, when using a water bath, is provided by supplying compressed air to the steam space adjacent the water level in said cooking receptacle.

8. The process according to claim 7, in which the compressed air is admitted so that, at the cooking and preserving temperature, the total external pressure considerably exceeds the partial pressure of the steam of 1 atms.

9. In the process of preserving vegetable produce in closed packages, the improvement comprising vacuum-packing a first kind of washed and/or peeled raw vegetable produce in a first empty partial space compartment of a plastic container, welding said first compartment without the addition of any water so that there is no water therein other than the natural juices of the raw produce therein, vacuum-packing a second kind of washed and/or peeled raw produce in a second empty partial space compartment of said plastic container, welding said second compartment without the addition of any water so that there is no water therein other than the natural juices of the raw produce therein, and repeating the vacuum-packing and welding steps with different kinds of produce until the total space of said container is filled, then introducing said filled container-package into a cooking receptacle and therein treating it for a period of time from about 35 minutes to about 2½ hours with a heating medium at a temperature of about 100° C while subjecting said container during cooking to an external pressure in said cooking receptacle exceeding the internal pressure in said package such that the container-package is firmly compressed and the produce therein can finish cooking without the container blowing up and bursting and finally cooling said container while it is still subjected to said higher external pressure, and further wherein the packaged vegetables, after cooking treatment and cooling, are stored in said vacuum sealed container at room temperature for considerable periods of time without deterioration of the wholesomeness of the produce.

* * * * *